(12) United States Patent
Ishikawa et al.

(10) Patent No.: US 8,321,113 B2
(45) Date of Patent: Nov. 27, 2012

(54) VEHICLE CONTROL DEVICE AND VEHICLE MOUNTED WITH THE DEVICE

(75) Inventors: Naoki Ishikawa, Sagamihara (JP); Katsumi Ueda, Sagamihara (JP); Masanobu Seki, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/680,886

(22) PCT Filed: Jul. 22, 2008

(86) PCT No.: PCT/JP2008/063486
§ 371 (c)(1),
(2), (4) Date: May 13, 2010

(87) PCT Pub. No.: WO2009/107259
PCT Pub. Date: Sep. 3, 2009

(65) Prior Publication Data
US 2011/0320067 A1    Dec. 29, 2011

(30) Foreign Application Priority Data
Feb. 29, 2008 (JP) .................................. 2008-049925

(51) Int. Cl.
*G06F 7/70* (2006.01)
(52) U.S. Cl. .......................................... 701/70
(58) Field of Classification Search ................. 701/2, 36, 701/48, 70, 78, 79, 83, 85; 180/244
See application file for complete search history.

(56) References Cited

U.S. PATENT DOCUMENTS

| | | | |
|---|---|---|---|
| 6,053,584 A * | 4/2000 | Schunck et al. | 303/167 |
| 6,226,586 B1 * | 5/2001 | Luckevich et al. | 701/70 |
| 6,246,944 B1 | 6/2001 | Maruyama | |
| 6,259,980 B1 * | 7/2001 | Peck et al. | 701/24 |
| 6,554,744 B2 | 4/2003 | Schmidt | |
| 6,719,076 B1 * | 4/2004 | Tabata et al. | 180/65.7 |
| 2002/0029914 A1 | 3/2002 | Schmidt | |

FOREIGN PATENT DOCUMENTS

| | | |
|---|---|---|
| DE | 199 09 326 A1 | 9/2000 |
| EP | 1 160 119 A1 | 12/2001 |

(Continued)

OTHER PUBLICATIONS

Chinese Office Action issued in Chinese Patent Application No. 200880110083.2 on Jul. 30, 2012.

*Primary Examiner* — Mary Cheung
*Assistant Examiner* — Michael D Lang
(74) *Attorney, Agent, or Firm* — Birch, Stewart, Kolasch & Birch, LLP

(57) ABSTRACT

A vehicle control device has a control device 10 mounted on a vehicle including an accelerator opening detecting sensor 2, a vehicle speed sensor 3, and braking means 7 capable of adjusting deceleration of the vehicle. The control device stores a plurality of deceleration tables 12 in which the deceleration is set according to a predetermined parameter. If the detected vehicle speed is equal to or less than a preset vehicle speed $V_1$ and the detected accelerator opening is equal to or less than a preset accelerator opening when a target deceleration is selected by the deceleration selecting means 4 and 5, the selection of the deceleration is validated, a deceleration table 12 corresponding to the deceleration selected by the deceleration selecting means is read, and the braking means is actuated on the basis of braking parameters specified in the table, thereby executing deceleration control to provide the selected deceleration.

12 Claims, 6 Drawing Sheets

FOREIGN PATENT DOCUMENTS

| | | |
|---|---|---|
| JP | 55-94844 A | 7/1980 |
| JP | 9-202221 A | 8/1997 |
| JP | 2000-233730 A | 8/2000 |
| JP | 2001-219831 A | 8/2001 |
| JP | 2001-301593 A | 10/2001 |
| JP | 2003-341496 A | 12/2003 |

* cited by examiner

VEHICLE CONTROL DEVICE AND VEHICLE MOUNTED WITH THE DEVICE

BACKGROUND OF THE INVENTION

1 Field of the Invention

The present invention relates to a vehicle control device and a vehicle mounted with the device for executing a deceleration function of being automatically decelerated according to a driver's accelerator operation state, and particularly, to a vehicle control device and a vehicle mounted with the device, capable of reproducing the feeling of a regenerative brake of a battery vehicle, or a hydrostatic transmission vehicle.

2 Description of the Related Art

Generally, a service brake which generates a braking force by the brake operation of a driver, and performs deceleration, stop, etc. during traveling of a vehicle, and a parking brake (parking brake) which mainly maintains the stopped state of the vehicle exist as a braking device mounted on the vehicle. Additionally, if the rotational frequency by the force transmitted from a wheel exceeds an idling rotational frequency during traveling of a vehicle, there is an engine brake which the difference therebetween becomes resistance, and acts as a braking force.

Moreover, as deceleration means during traveling, there is means (for example, braking means using oil pressure or air pressure) which gives deceleration in the case of a predetermined operational state irrespective of driver's brake operation, in addition to the aforementioned engine brake.

For example, Patent Document 1 (Japanese Patent Application Laid-Open No. 9-95222 discloses a deceleration addition device in which whether an accelerator is in any region of three accelerator stepped-on or returned states of a deceleration region, an inertia traveling region, an acceleration traveling region is detected by a stroke sensor which detects a stepped-on state or a returned state of an accelerator, and if a deceleration addition controller has determined that the accelerator is in the deceleration region on the basis of the output of an accelerator stroke detecting sensor, a braking force is added to a main brake system via a braking force control device.

Additionally, Patent Document 2 (Japanese Patent Application Laid-Open No. 2001-219831) discloses a deceleration control device for a vehicle adapted to perform the control of adding deceleration if the accelerator is return-operated in a region where the accelerator opening is able to minimize the output of a driving source of the vehicle.

However, when the vehicle is decelerated until it is stopped by the deceleration control during traveling, since the vehicle stops in a state where an operator does not perform brake operation, there is a possibility that an operator's operation feeling may be spoiled.

Additionally, for example, if a vehicle is shared by a plurality of operators, the types of vehicles they have become accustomed to driving differ according to the operators. Thus, a proper driving feeling may not be obtained merely by giving a constant braking force.

SUMMARY OF THE INVENTION

Accordingly, the object of the invention is to provide a vehicle control device and a vehicle mounted with this device, capable of properly setting a braking force to bring an operator's feeling into an optimal state, in view of the problems of the above conventional technique.

Thus, in order to solve these problems, the invention provides a vehicle control device mounted on a vehicle including a vehicle speed sensor which detects a vehicle speed, an accelerator opening detecting sensor which detects an accelerator opening, and braking means capable of adjusting deceleration of the vehicle.

The control device includes a storage unit which stores deceleration tables in which braking parameters required to acquire a predetermined deceleration are set, and deceleration selecting means which selects a target deceleration by the operation of an operator or a vehicle maintenance worker (also including a mechanic).

If the vehicle speed detected by the vehicle speed sensor is equal to or less than a preset vehicle speed $V_1$ and the accelerator opening detected by the accelerator opening detecting sensor is equal to or less than a preset accelerator opening when the target deceleration is selected from the deceleration selecting means, the selection of the deceleration is validated, a deceleration table corresponding to the deceleration selected by the deceleration selecting means is read from the storage unit, and the braking means is actuated on the basis of the braking parameters specified in the table, thereby executing deceleration control so as to provide the selected deceleration.

According to the invention, since the deceleration selecting means is provided to select a target deceleration by operation of an operator or a vehicle maintenance worker, it is possible to change deceleration according to the operator, etc. and it is possible to improve an operation feeling.

Particularly, deceleration tables in which braking parameters required to acquire a predetermined deceleration are set are provided. Therefore, it is possible to perform deceleration control having a deceleration curve similar to a regenerative brake of a battery vehicle or an HST vehicle which has conventionally been frequently used by operators, and it is possible to reproduce a feeling corresponding to a previous work vehicle of an individual operator.

Additionally, in the invention, if the vehicle speed detected by the vehicle speed sensor is equal to or less than a preset vehicle speed $V_1$ and the accelerator opening detected by the accelerator opening detecting sensor is equal to or less than a preset accelerator opening, the selection of the deceleration is validated. Therefore, deceleration control is not operated in the case of sudden starting (when an accelerator is strongly stepped on) or in the case of a high speed (including a high speed of, for example, about 15 to 20 km/h or higher in the case of a work vehicle), and thus, a driver is very safe.

Additionally, if the vehicle speed detected by the vehicle speed sensor becomes less than a preset vehicle speed $V_2$ ($0<V_2<V_1$) during execution of the deceleration control, the braking of the braking means is weakened or is brought into a non-actuation state, and the execution of the deceleration control is released.

For example, if a retarder or exhaust brake which adds a braking force to a conventionally used engine brake is utilized for the braking means for the automatic deceleration control, when the preset setting value $V_2$ of the vehicle speed becomes less than a threshold value (for example, during the inertia traveling of 1 to 5 km/h), it is possible to release the additional braking means, and shift to normal braking control of a main brake, an engine brake, etc. Thus, safety is further improved.

Additionally, a remote control unit is provided in the deceleration selecting means so that the deceleration selection of the deceleration selecting means can be performed from a vehicle maintenance worker (mechanic) outside the vehicle by a wireless circuit or wired circuit.

By providing the remote control unit in this way, it is possible for a vehicle maintenance worker to change the deceleration settings.

Moreover, the deceleration selecting means is arranged within a driver's seat so as to allow operation by an operator.

By adopting a configuration in which deceleration is set by the deceleration selecting means (deceleration selecting switch) provided within a driver's seat, it is possible for the operator himself to perform deceleration control having a deceleration curve similar to a regenerative brake of a battery vehicle or an HST vehicle suited to operator's feeling.

Furthermore, the preset vehicle speed $V_1$ and the preset accelerator opening are set so as to be variable in correspondence with the selected deceleration.

Thereby, it is possible to set deceleration control start timing suited to a regenerative brake of a battery vehicle or HST vehicle, it is possible to perform brake control with higher precision, and it is possible to improve an operator's feeling to one of ease of driving, or a feeling of high safety.

Additionally, the vehicle of the invention is a vehicle mounted with the aforementioned control device. Thereby, even in a case where a vehicle is shared by a plurality of operators, it is possible to provide a vehicle capable of realizing a feeling suited to an individual operator.

As described above, according to the invention, it is possible to make a change of deceleration according to an operator or a corresponding vehicle type, and it is possible to improve an operation feeling.

Additionally, deceleration tables in which braking parameters required to acquire a predetermined deceleration are set are provided. Therefore, it is possible to reproduce a deceleration control feeling having a deceleration curve similar to a regenerative brake of a battery vehicle or an HST vehicle which has conventionally been frequently used by operators.

Moreover, when the preset setting value $V_2$ of the vehicle speed becomes less than a threshold value (for example, 2 to 5 km/h), it is possible to release the additional braking means, and shift to normal braking control of a main brake, an engine brake, etc. Thus, safety is further improved.

Additionally, not only it is possible for a vehicle maintenance worker (mechanic) to change the deceleration settings, but also it is possible for an operator himself to change the deceleration settings. Therefore, it is possible to be suited to an operator's favorite feeling, or it is possible to achieve a unified operation feeling even if industrial vehicles within a factory are small-sized or large-sized.

Furthermore, it is possible to set deceleration control start timing suited to a regenerative brake of a battery vehicle or HST vehicle, it is possible to perform brake control with higher precision, and it is possible to improve an operator's feeling to one of ease of driving, or a feeling of high safety.

BRIEF DESCRIPTION OF THE DRAWINGS

FIG. 5A illustrates a case where deceleration is variably controlled during the automatic deceleration control, and FIG. 5B illustrates a case where deceleration is kept constant during the automatic deceleration control.

DETAILED DESCRIPTION OF THE INVENTION

An embodiment of the invention will be illustratively described below in detail with reference to the drawings. Here, the dimensions, materials, shapes, relative arrangements, etc. of component parts described in this embodiment are not meant to limit the scope of the invention, but are merely simple explanatory examples, especially where there is no specific description of limitations.

Figure 1:
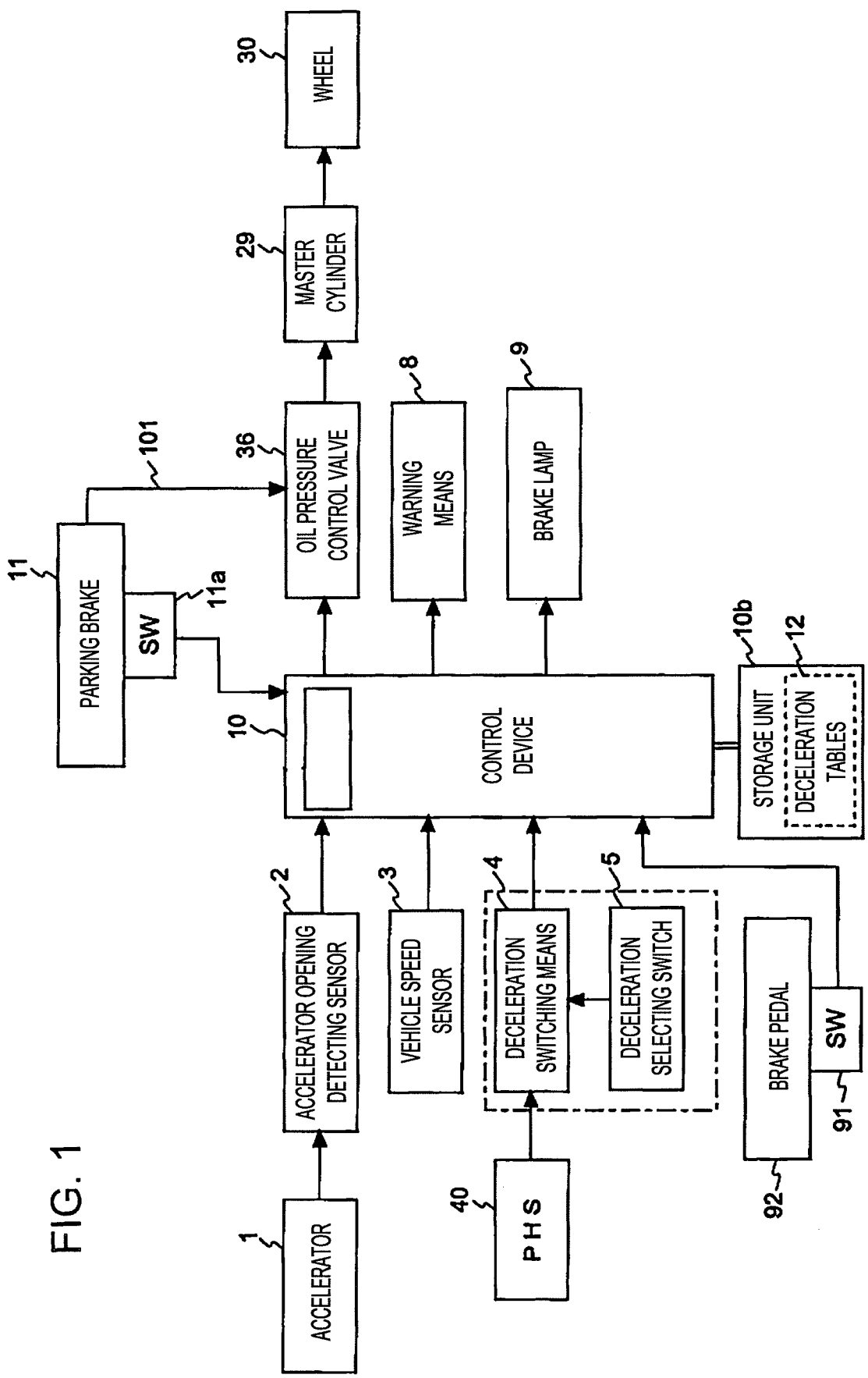
FIG. 1 is a schematic configuration view of a control device according to an embodiment of the invention and its peripheral device.
Figure 2:
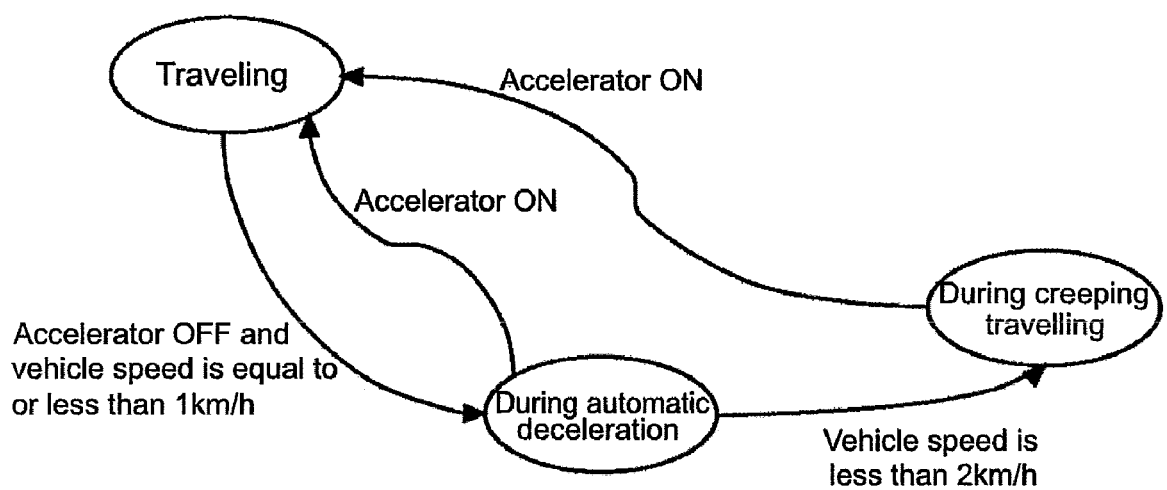
FIG. 2 is a state transition diagram illustrating a control according to the embodiment of the invention.
Figure 3:
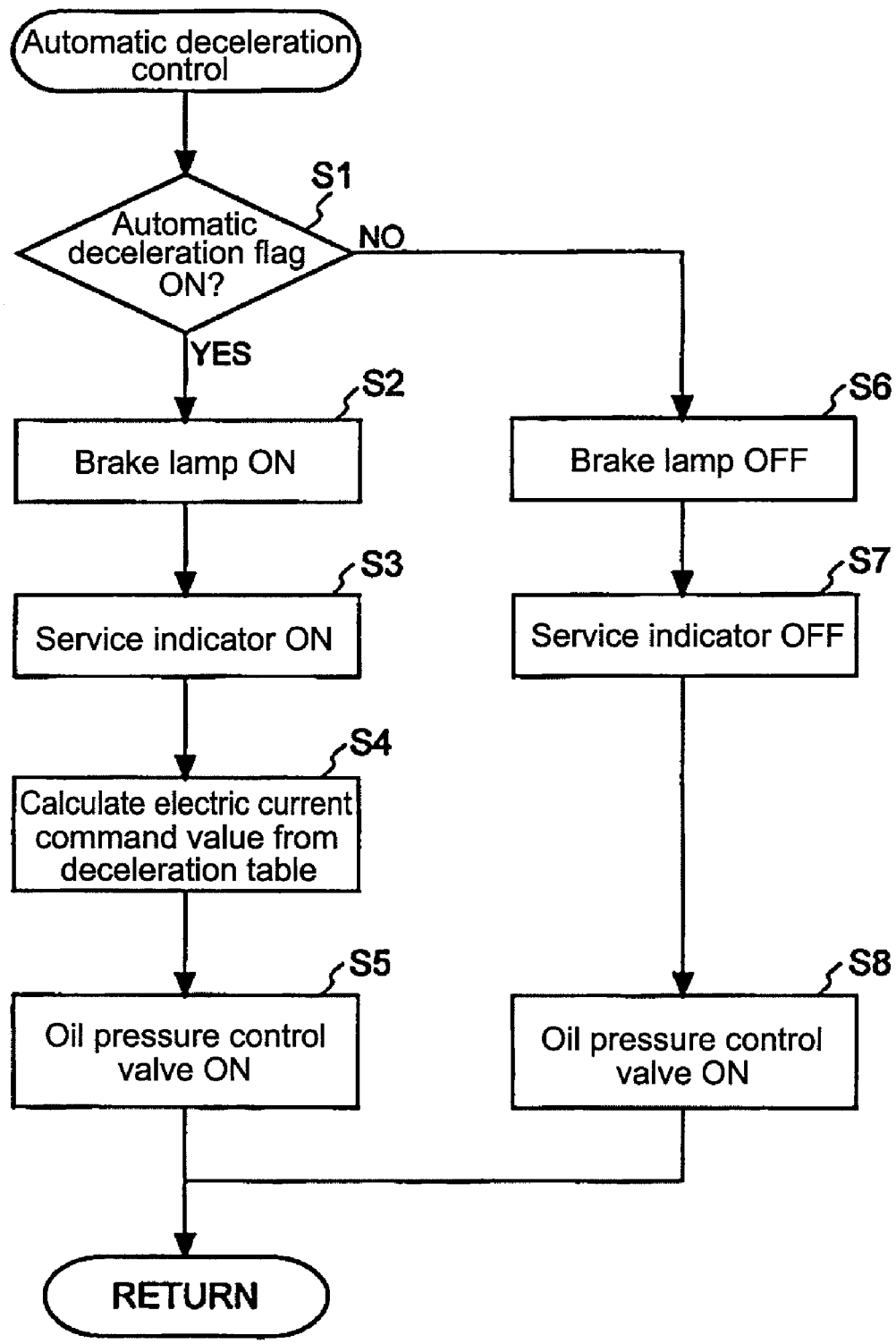
FIG. 3 is a flow chart illustrating the processing of an automatic deceleration control according to this embodiment.
Figure 4:
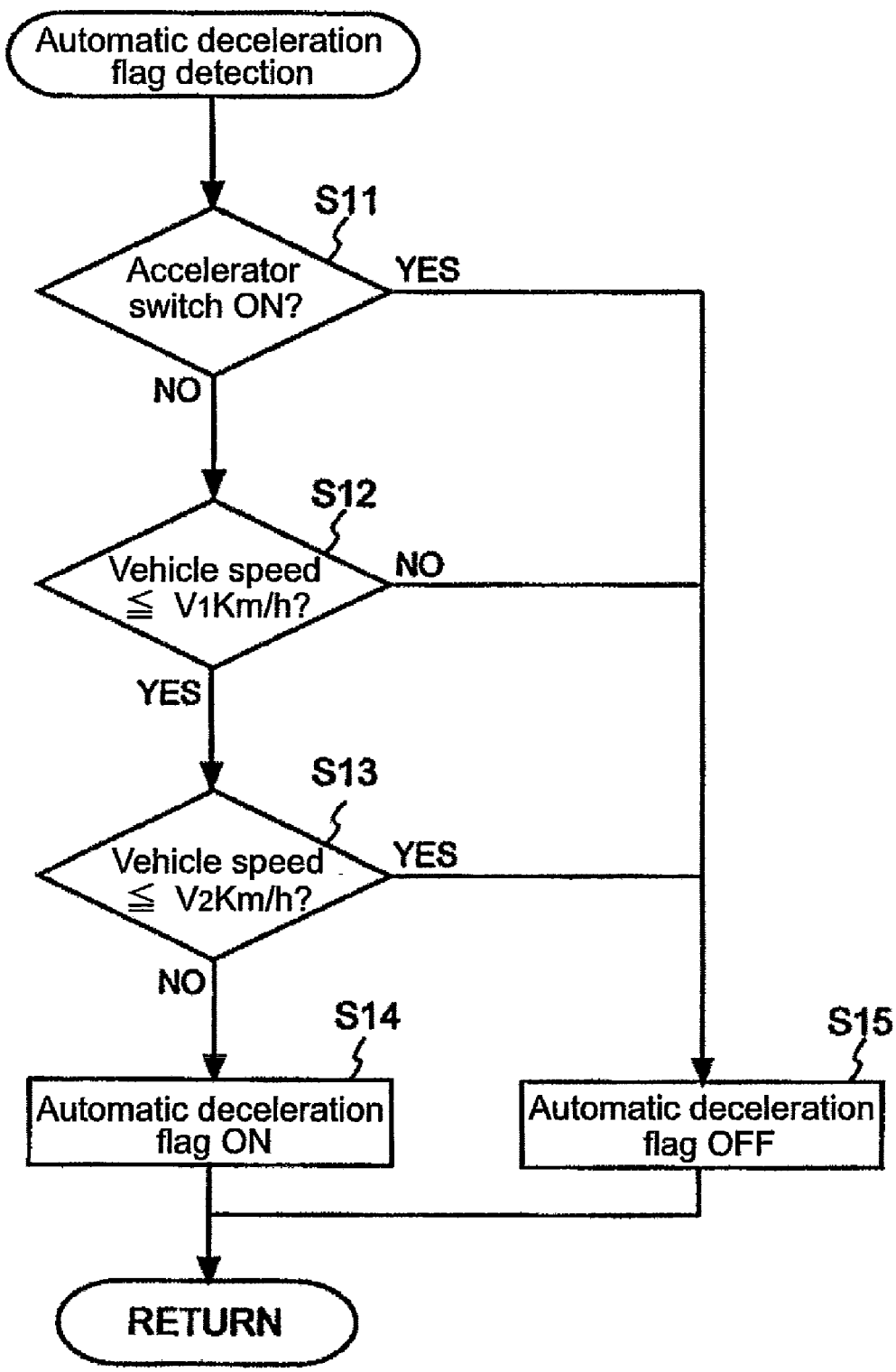
FIG. 4 is a flow chart illustrating the detection processing of an automatic deceleration flag according to this embodiment.
Figure 5A:
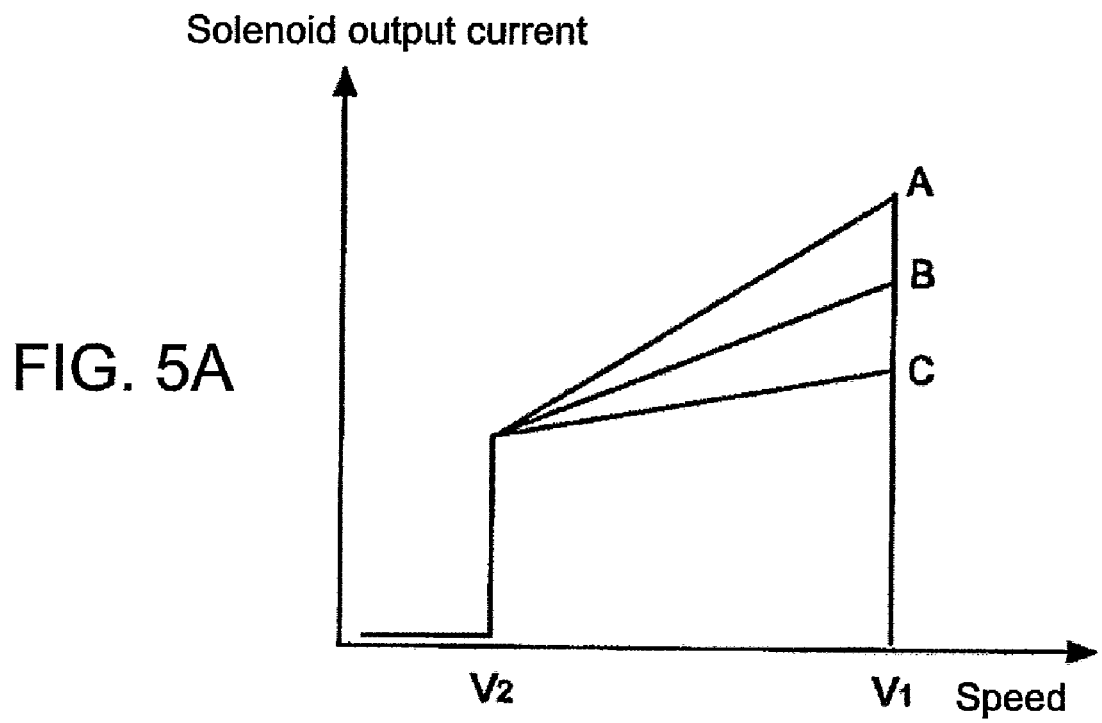
FIGS. 5A and 5B are views illustrating a deceleration table.
Figure 5B:
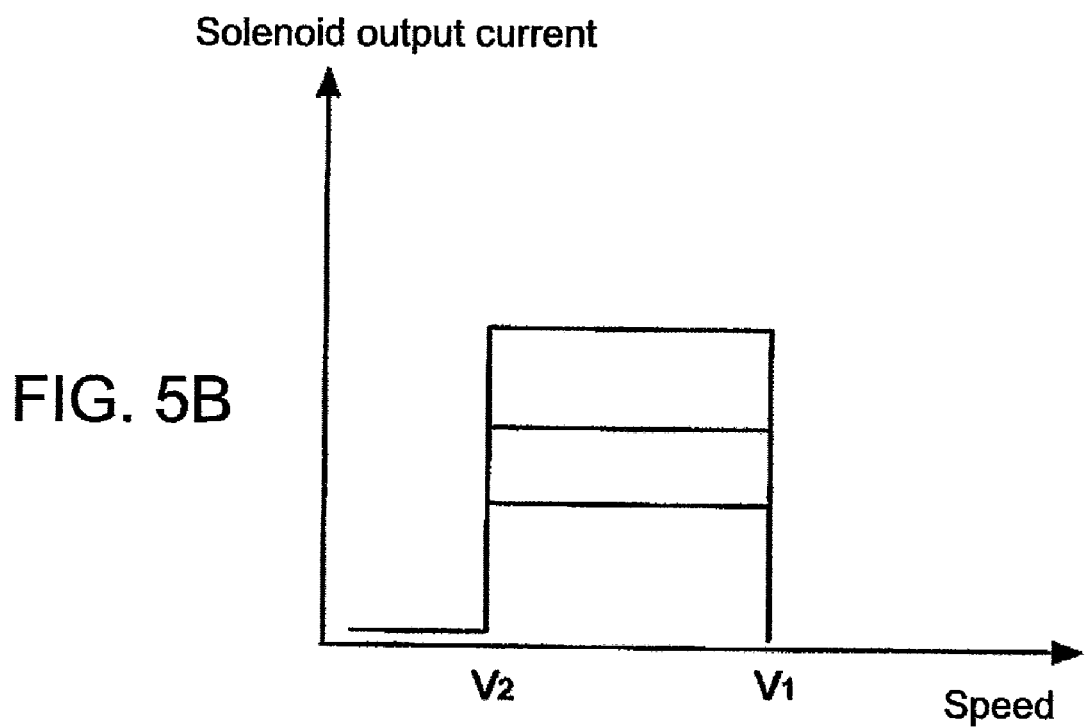
Figure 6:
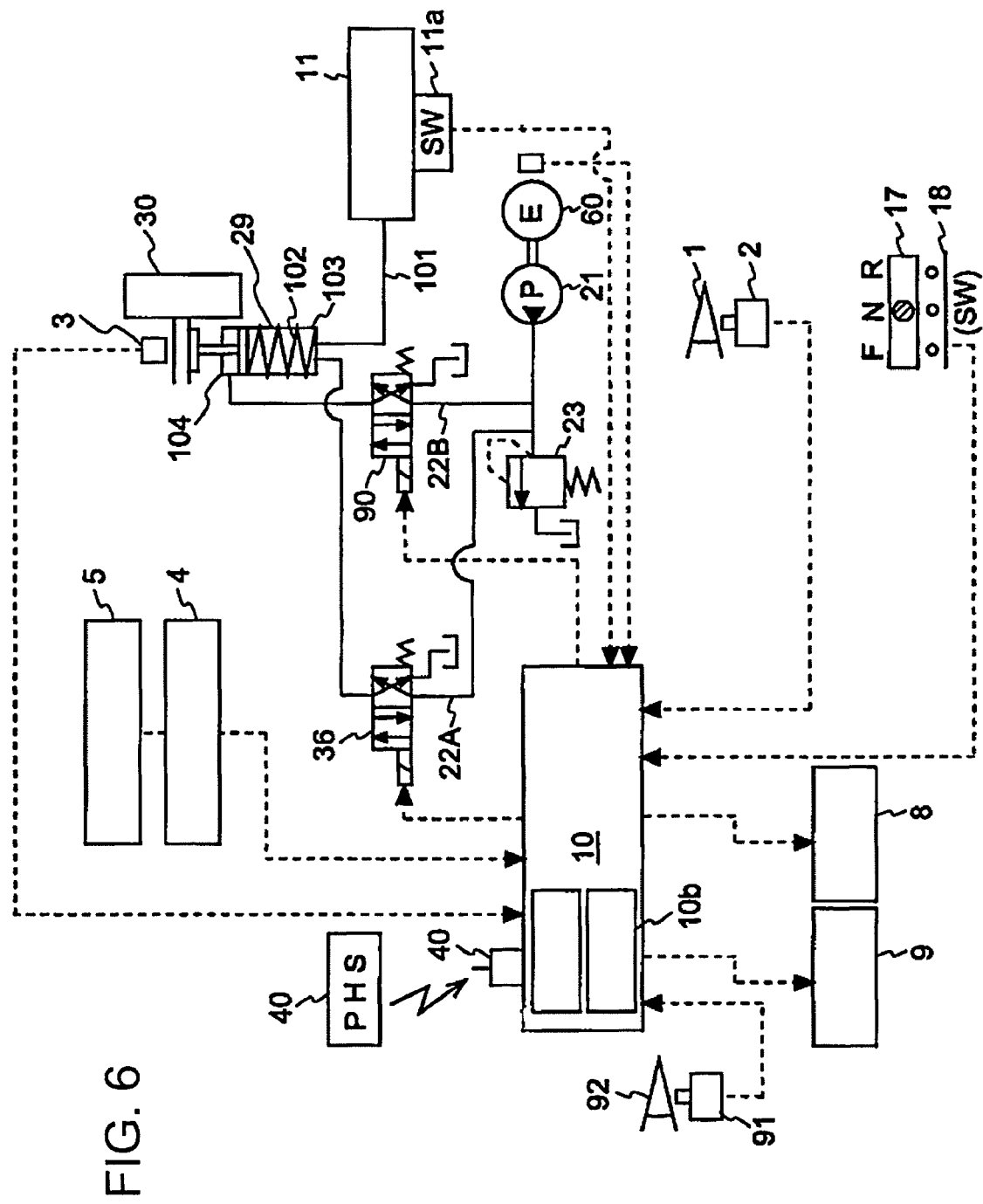
FIG. 6 is a control block diagram of the invention illustrating the brake relationship of a vehicle control unit to which the invention is applied.

FIG. 1 is a schematic configuration view of a control device according to an embodiment of the invention and its peripheral device, FIG. 2 is a state transition diagram illustrating a control according to the embodiment of the invention, FIG. 3 is a flow chart illustrating the processing of an automatic deceleration control according to this embodiment, FIG. 4 is a flow chart illustrating the detection processing of an automatic deceleration flag according to this embodiment, FIGS. 5A and 5B are views illustrating a deceleration table, and FIG. 6 is a control block diagram of the invention illustrating the brake relationship of a vehicle control unit to which the invention is applied.

The configuration according to this embodiment is applied to various vehicles including a passenger vehicle, and particularly, is suitably applied to industrial vehicles represented by material handling machines, such as a forklift and a reach stacker, or construction and civil engineering machines, such as a motor grader, a bulldozer, and a wheel loader.

The schematic configuration of a control device applied to this embodiment will be described with reference to FIG. 1.

This control device 10 includes a computer having a CPU, a RAM, a ROM, etc., therein, and has input thereto electrical signals from various sensors provided in a vehicle. The control device 10 is adapted to control the energization to an oil pressure control valve (additional braking means) 36 on the basis of the input signals, thereby turning on/off and proportionally controlling the control valve 36, to adjust the oil pressure to be applied to a master cylinder 29 from a hydraulic circuit (refer to FIG. 6), and to control the braking force of a wheel 30. The control device 10 includes a storage unit 10b, and a plurality of deceleration tables 12 showing the correspondence between electric signals (analog or frequency pulses) corresponding to braking patterns of a regenerative brake (BE) of a battery vehicle, an HST vehicle (HS), or a passenger vehicle (A), and oil pressure patterns are stored in the storage unit 10b. The deceleration tables 12 may be stored in advance in the storage unit 10b, and the deceleration tables are able to be added by inputting and setting by an information terminal, etc. capable of communicating with the control device 10.

Additionally, the braking force of the wheel 30 through the master cylinder 29 by the switching of a deceleration operation signal similar to a braking pattern of an operation signal (a regenerative brake (BE) of a battery vehicle, an HST vehicle (HS), or a passenger vehicle (A)) is adapted to be variable corresponding to the switching of the deceleration operation signal, and deceleration is suitably selected via deceleration switching means 4 by a deceleration selecting switch 5 provided in a PHS (remote control unit) 40 or a vehicle. In addition, in this embodiment, a drawing in which the braking force to the wheel 30 is adjusted via the master cylinder 29 whose oil pressure is variably controlled by the oil pressure control valve (additional braking means) 36. However, the invention is not limited thereto, and desirably includes braking means (fluid control brake, etc.) capable of adjusting the deceleration to either a main brake system which transmits a braking force to a wheel side via a hydraulic system or an air pressure system according to a driver's brake pedal operating force or a parking brake device which transmits a braking force to the wheel side via a cable by driver's manual operation, a solenoid oil pressure control valve which adjusts a fluid pressure corresponding to deceleration by a control signal, etc. Additionally, in addition to such a braking device, an exhaust brake, a Powertard, and a retarder may be combined as means which enhance the engine-brake effect of a vehicle.

Moreover, warning means 8 is actuated if necessary by the electric input signal. The processing flow of the control device 10 will be described below in detail.

Additionally, the deceleration selecting switch 5 is a switch operated by an operator and arranged at a driver's seat in order to obtain a deceleration feeling similar to a braking pattern of an operation signal (a regenerative brake (BE) of a battery vehicle, an HST vehicle (HS), or a passenger vehicle (A)), and the operation signal is sent to a control unit (ECU) via the deceleration switching means 4 (relay).

Additionally, the PHS (remote control unit) 40 is annexed to the deceleration switching means 4 via the control unit (ECU), and a deceleration operation signal similar to a braking pattern of an operation signal (a regenerative brake (BE) of a battery vehicle, an HST vehicle (HS), or a passenger vehicle (A)) by the communication from a serviceman is sent to the control device (ECU) 10.

In the control device (ECU) 10 which has received the deceleration operation signal, it is possible to send an oil pressure adjustment signal to the oil pressure control valve (additional braking means) 36, adjust the oil pressure of the hydraulic circuit (refer to FIG. 6) by the oil pressure control valve (additional braking means) 36, and to drive a brake shoe (associated with wheel 30) via a master cylinder 29 so as to perform deceleration control with a deceleration curve similar to the regenerative brake of the battery vehicle or the HST vehicle.

A plurality of sensors which detects a vehicle state or an operation state by an operator is connected to the control device 10. At least an accelerator opening detecting sensor 2 which detects at least the amount of depression of an accelerator 1 which is depressed by the operator, and a vehicle speed sensor 3 which detects a vehicle speed are connected to the control device.

The accelerator opening detecting sensor 2 detects the amount of depression of the accelerator 1 operated by the operator, and outputs the amount of depression to the control device. The amount of accelerator depression and an output value to be output to a proportional valve (not shown) for adjustment of a throttle valve of an engine in correspondence with the amount of accelerator depression are associated with each other stored in the control device 10. The control device 10 controls the rotational frequency of the engine by adjusting the output to be supplied to the proportional valve for control of the throttle valve of the engine according to a detection signal from the accelerator opening detecting sensor 2 on the basis of the stored information. The accelerator 1 is a device which is disposed at a control portion for the operator to set a desired rotational frequency, and an accelerator, an accelerator switch, an accelerator lever, etc. are used.

The vehicle speed sensor 3 is a device which detects the vehicle speed of an industrial vehicle to output the detected value to the control device 10, and includes, for example, a rotational frequency sensor provided in a final reduction mechanism, and a device or the like which inputs a vehicle speed signal based on a rotational frequency pulse to the control device 10 is used for the vehicle speed sensor.

Additionally, the control device 10 is adapted to actuate the warning means 8, and a brake lamp 9 when a brake switch 91 which detects the depression of the brake pedal 92 is turned on, and the automatic deceleration control related to this embodiment is executed, if necessary by the input signal.

Moreover, in this embodiment, it is preferable to include the warning means 8. The warning means 8 is means for issuing a warning to the operator or a third party around the vehicle when the automatic deceleration control according to this embodiment is executed, and includes, for example, a warning buzzer which outputs a voice or a warning sound, or a warning lamp which turns on/off a lamp. Additionally, screen display means may be adopted as the warning means 8. In this case, it is preferable to always display a vehicle state on a screen.

Furthermore, when the automatic deceleration control according to this embodiment is executed, the brake lamp 9 provided in the vehicle may be turned on.

Here, a braking system which is generally provided in a vehicle includes a service brake (service brake) which performs deceleration, stop, etc. during traveling of the vehicle, and a parking brake (parking brake) which mainly maintains the stopped state of the vehicle.

When the brake pedal 92 of the service brake is depressed, a brake pedal sensor 91 detects a detection signal according to the amount of depression of the brake pedal. Then, the detected detection signal is input to the control device 10. In the control device 10, a target value of deceleration of the vehicle is calculated from the detection signal, a control signal is output so as to approach the calculated target value, and a brake mechanism of the service brake is controlled according to this control signal.

Meanwhile, the parking brake is a device which applies the brake to the vehicle by a mechanical or electric method, and there are a type in which a parking brake mechanism is incorporated into a main body of the service brake, and a type in which a mechanism only for the parking brake is independently provided.

Next, the configuration of the vehicle control unit of the invention around a brake will be described on the basis of the brake relationship which will be described with reference to FIG. 6.

In the control block diagram shown in this drawing, the configuration of this embodiment has the accelerator 1, the brake pedal 92, and a parking brake 11, respectively, and the brake pedal 92 is adapted to pressurize oil pressure via a hydraulic circuit (not shown) and a master cylinder (not shown) apply a brake force on an axle or the wheel 30.

Meanwhile, the parking brake 11 is adapted to actuate a master cylinder 29 including an oil pressure chamber 103 which houses a coil spring 102, and an oil hydraulic cylinder 104 located on the side opposite thereto, via a mechanical brake line 101, such as a wire or a link, and to apply (validate) a braking force to the axle (driving wheel) or release braking.

Here, the master cylinder 29 is adapted such that not only a braking force is transmitted via the mechanical brake line 101, such as a wire or a link by the parking brake 11, but also braking is released or a braking force is applied by an oil pressure force. For example, in order to release braking, a solenoid braking release valve (oil pressure opening and closing valve for release of brake braking) 90 is opened by a control signal from the control device 10 to control the supply of the pressure oil to an oil hydraulic cylinder via a hydraulic circuit 22B by a hydraulic pump 21 driven by an engine 60, or in order to apply a braking force, the solenoid oil pressure control valve 36 is opened by a control signal from the control device 20 to supply pressure oil to the oil pressure chamber 103 which houses the coil spring 102 of the master cylinder 29 via a hydraulic circuit 22A, thereby validating braking. In addition, similarly to FIG. 1, 8 is the warning means, 9 is the brake lamp, 17 is a shift lever for forward, neutral, reverse, 18 is a switch which detects the position of the lever, and 23 is a relief valve.

Accordingly, the parking brake mechanism of this embodiment includes brake hydraulic circuits (22A, 22B) for control juxtaposed at the mechanical brake line 101, includes the solenoid oil pressure control valve 36 and the solenoid braking release valve 90 via the brake hydraulic lines (22A, 22B) for control, and controls the actuation of the oil pressure force of the intervened hydraulic lines by the control of energization of the solenoid oil pressure control valve 36, thereby a braking force to the axle or the wheel 30. On the other hand, when the solenoid braking release valve 90 is opened, pressure oil is supplied to the oil hydraulic cylinder 104, which results in braking release.

In this case, in order to make the parking brake mechanism function as a negative brake, an oil pressure force supplied to the oil hydraulic cylinder 104 is made greater than the "Oil pressure force supplied to the coil spring 102+Oil pressure chamber 103", thereby making the parking brake mechanism function as a negative brake.

Accordingly, both the solenoid oil pressure control valve 36 and the braking release valve 90 are oil pressure opening and closing valves which are interposed in the hydraulic circuits 22A and 22B between the hydraulic pump 21 and the oil pressure chamber 103 (or the oil hydraulic cylinder 104), and are solenoid oil pressure opening and closing valves whose opening/closing is controlled on the basis of a signal from the control device 10.

Thereby, the solenoid oil pressure control valve (additional braking means) 36 into which an electromagnetic valve is incorporated is adapted so that a braking force is applied even when the control signal from the control unit (ECU) 10 is received and a signal (brake ON/OFF) of the switch 11a of the parking brake 11 is OFF and so that the electromagnetic valve is opened when the braking signal is ON to send the oil pressure from the hydraulic pump 21 to the circuit 22A which is forcibly driven by the engine, drive the master cylinder 29, and apply a brake force to the axle or wheel 30.

As described above, in this embodiment, the parking brake 11 has a configuration in which braking is capable of being controlled by the oil pressure control valve (additional braking means) 36. However, a case where the invention has a configuration in which braking of the brake of the brake pedal (service brake) 92 is capable of being controlled by the oil pressure control valve (additional braking means) 36 is also included within the technical range of the invention. For example, when a detection value from the accelerator opening detecting sensor 2 and a detection value from the vehicle speed sensor 3 satisfy predetermined conditions, the oil pressure force of the oil pressure control valve (additional braking means) 36 is adjusted to actuate the wheel 30 automatically via the master cylinder 29 so that predetermined deceleration is obtained.

Additionally, other than the arrangement of the above oil pressure control valve, a braking force application pattern when an operator performs brake operation during the activation of the automatic deceleration control of the invention can also be selected. For example, when the brake pedal is stepped on during the activation of the above automatic deceleration control, a resultant force of a braking force equivalent to the automatic control and a braking force according to a brake pedal force may be exhibited, or a larger one of the braking force equivalent to the automatic control and the braking force according to the brake pedal force may be exhibited. In the latter case, it is desirable to add and set the processing of comparing the magnitude between the braking force equivalent to the automatic control and the braking force according to the brake pedal force in the control unit. In either case, it is preferable to adopt a configuration in which emergency braking operation is capable of being received in addition to the automatic deceleration control.

In this embodiment, an example in which the automatic deceleration control shown in FIG. 2 is executed on a configuration in which the parking brake 11 has a configuration in which braking is capable of being controlled by the oil pressure control valve (additional braking means) 36 will be described.

In the automatic deceleration control of this embodiment, a setting value X (threshold value) of the accelerator opening which becomes a start condition of the automatic deceleration control, a setting value $V_1$ (for example, 10 km/h) of the vehicle speed which becomes the start condition similarly, and a setting value $V_2$ (for example, 2 km/h) of the vehicle speed which becomes a termination condition of the automatic deceleration control are set in advance in the control device 10. In addition, setting value $V_1$>Setting value $V_2$>0 km/h is satisfied.

Additionally, deceleration which meets an operator's feeling is selected in advance according to a switching signal of a deceleration operation signal similar to a braking pattern of a regenerative brake (BE) of a battery vehicle, an HST vehicle (HS), or a passenger vehicle (A). As for the selection of this deceleration, there are two ways including (1) a case where the deceleration switching means 4 is switched by a signal from the PHS 40, and (2) a case where the deceleration selecting switch 5 is arranged at a driver's seat.

As for the deceleration, a plurality of deceleration tables 12 showing the correspondence between electric signals (analog or frequency pulses) corresponding to braking patterns of a regenerative brake (BE) of a battery vehicle, an HST vehicle (HS), or a passenger vehicle (A), and oil pressure patterns is stored in the storage unit 10b of the control device 10, and a deceleration table 12 corresponding to a braking pattern of the regenerative brake (BE) of the battery vehicle, the HST vehicle (HS), or the passenger vehicle (A) is selected. The deceleration tables are data tables obtained by assigning deceleration during automatic control, time and speed, and electric signals (analog or frequency pulses) and oil pressure patterns to parameters in time-series. There is a case where deceleration is variably controlled according to the predetermined parameters, and a case where deceleration is constantly controlled. An example of the deceleration tables 12 is shown in FIG. 5. FIG. 5A illustrates a case where deceleration is variably controlled during the automatic deceleration control, and FIG. 5B illustrates a case where deceleration is kept constant during the automatic deceleration control. Additionally, in any case, a plurality of deceleration tables (A, B, C, . . . in the drawing) are provided, and the automatic deceleration control is made within a range of setting value $V_1 \geq$Vehicle speedSetting value $V_2$>0. A deceleration table is selected from the plurality of deceleration tables by external communication means 40 or the deceleration selecting switch 5 so that a deceleration corresponding to a braking pattern of a regenerative brake (BE) of a battery vehicle, an HST vehicle (HS), or a passenger vehicle (A) is obtained as a time-series variation of electric signals and oil pressure patterns.

(1) When External Communication Means 40 is Used

The external communication means 40 is an information terminal capable of communicating with the control device 10 by radio or cables, and for example, a personal digital assistant, such as PHS, is used. The external communication means 40 is brought into a communicable state with the control device 10, and a desired deceleration table 12 is selected from the plurality of deceleration tables 12 stored in the storage unit 10b of the control device 10. If the selected deceleration table 12 is set within the control device 10, and the automatic deceleration control is executed, energization of the oil pressure control valve (additional braking means) 36 is controlled along the set deceleration table 12, and a braking force is applied to the wheel 30 via the master cylinder 29.

(2) When Deceleration Selecting Switch 5 is Used

The deceleration selecting switch 5 arranged in a place like a driver's seat where an operator can operate it, is electrically connected to the control device 10 electrically, and is enabled to directly select a deceleration table 12 stored in the storage unit 10b of the control device 10. If a desired deceleration table 12 is selected from the plurality of deceleration tables 12 by the deceleration selecting switch 5, the selected deceleration table 12 is set within the control device 10, and the automatic deceleration control is executed, the oil pressure, which is obtained by proportionally controlling and adjusting energization of the oil pressure control valve (additional braking means) 36 is along the set deceleration table 12, is transmitted to the master cylinder 29, and a braking force is applied to the wheel 30 via the master cylinder 29.

As described above, in the automatic deceleration control of the invention, respective threshold values and deceleration tables are set in advance, and as shown in FIG. 2, during vehicle traveling, the oil pressure control valve (additional braking means) 36 is turned off, and only the parking brake 11 is brought into an operating state (additional braking is invalid). If the warning means 8 is provided, this waning means is also brought into an OFF state. In addition, if the warning means 8 is screen display means, it is preferable to display a vehicle state during vehicle traveling.

During traveling or during stopping, if any of signals from a regenerative brake (BE) of a battery vehicle, an HST vehicle (HS), and a passenger vehicle (A) is selected via the deceleration selecting switch 5, and the oil pressure control valve (additional braking means) 36 is turned on, the following automatic deceleration control is executed. First, if an engine is turned on and is in a traveling state, the control device 10 detects that the accelerator opening detected by the accelerator opening detecting sensor 2 is equal to or less than a preset predetermined accelerator opening, and if it is detected that the vehicle speed detected by the vehicle speed sensor 3 is within a range of vehicle speed setting value $V_1 \geq$ Vehicle speed Setting value $V_2 > 0$ which is set in advance, the control device 10 outputs a control signal which switches on the oil pressure control valve (additional braking means) 36, and adjust the oil pressure applied to the master cylinder 29 to control the adjustment of the braking force to the wheel 30 so as to provide a deceleration corresponding to, for example, a regenerative brake (BE) of a battery vehicle. If the warning means 8 and the brake lamp 9 are provided in a stage where this automatic deceleration control is executed, these means are switched on.

During execution of the automatic deceleration control, if it is detected by the vehicle speed sensor 3 that the vehicle speed has reached less than the vehicle speed $V_2$ km/h (for example, a creeping traveling speed around 2 km/h) which is set in advance, the control device 10 outputs a control signal which switches off the oil pressure control valve (additional braking means) 36, thereby releasing the automatic deceleration control. If the warning means 8 and the brake lamp 9 are provided, these means are switched off and stopped.

Additionally, if it is detected that the accelerator opening has increased by stepping on the accelerator 1 again, the vehicle returns to a traveling state.

Next, the processing flow by the aforementioned control device 10 will be described in detail with reference to FIGS. 3 and 4.

The processing flow of the automatic deceleration control is shown in FIG. 3. In addition, a flag which determines the existence/non-existence of setting which performs the control (hereinafter referred to as automatic deceleration control) of making a braking force act automatically according to accelerator operation of an operator is defined as an automatic deceleration flag.

First, a setting value X (threshold value) of the accelerator opening which becomes a start condition of the automatic deceleration control, a setting value $V_1$ of the vehicle speed which becomes the start condition similarly, and a setting value $V_2$ of the vehicle speed which becomes a termination condition of the automatic deceleration control are set in advance in the control device 10. Moreover, a desired deceleration table 12 is selected in advance from the storage unit 10b of the control device 10 by the external communication means 40 or the deceleration selecting switch 5.

In this drawing, any of signals from a regenerative brake (BE) of a battery vehicle, an HST vehicle (HS), and a passenger vehicle (A) is turned on via the deceleration selecting switch 5 during traveling or during stopping, and the control device 10 determines whether or not the automatic deceleration flag is set to ON (S1). If the flag is set to ON, the brake lamp is turned on (S2), and a service indicator is turned on (S3). Additionally, in correspondence with switching of the deceleration selecting switch 5 of any of signals from a regenerative brake (BE) of a battery vehicle, an HST vehicle (HS), and a passenger vehicle (A), an electric current command value is calculated according to the selected deceleration table (S4), and energization to the oil pressure control valve (additional braking means) 36 is controlled on the basis of the electric current command value (S5).

On the other hand, if the automatic deceleration flag is set to OFF, the brake lamp is turned off (S6), and the service indicator is turned off (S7). Additionally, the oil pressure control valve (additional braking means) 36 is turned off and is switched to the state where only the service brake (brake pedal 92) operates (additional braking is invalid) (S8).

The detection flow of the automatic deceleration flag is shown in FIG. 4. First, it is determined whether or not an accelerator switch (accelerator 1) is ON (S11). At this time, the setting value X of the preset accelerator opening is used as a threshold value. Here, if the detected accelerator opening is equal to or more than the amount of depression of the setting value X, it is determined as ON, and if the detected accelerator opening is the amount of depression which is less than the setting value X, it is determined as OFF.

If the accelerator switch is determined to be OFF, it is determined that the vehicle is in a deceleration state (S11). It is then determined whether or not the vehicle speed detected by the vehicle speed sensor 3 is reduced to the setting value "$V_1 \geq$ Vehicle speed" which becomes a start condition of the automatic deceleration control which is set in advance (S12). If the vehicle speed is reduced to the setting value "$V_1 \geq$ Vehicle speed" and is within a range of "Vehicle speed $\geq V_2$" (S13), the automatic deceleration flag is set to ON (S14), and the aforementioned automatic deceleration control is performed. Then, if the vehicle speed is reduced to "Vehicle speed<$V_2$" by the aforementioned automatic deceleration control, the automatic deceleration flag is turned off (S15), and the automatic deceleration control is ended.

On the other hand, if the accelerator switch is determined to be ON, and if the vehicle speed is equal to or more than the setting value $V_1$, the OFF state of the automatic deceleration flag is continued shifting to the aforementioned automatic deceleration control (S15).

As such, according to this embodiment, if the vehicle speed is within a set vehicle speed range, and the accelerator opening becomes less than a setting value, the automatic deceleration control which is decelerated automatically is performed, and at this time, a configuration in which deceleration can be preset is adopted. Therefore, it is possible to change deceleration according to an operator and it is possible to improve an operation feeling.

Additionally, since a configuration in which deceleration is selected from a plurality of deceleration tables is adopted, it is possible to reproduce a feeling adapted to an individual operator like a regenerative brake of a battery vehicle, or an HST vehicle.

Moreover, any of signals from a regenerative brake (BE) of a battery vehicle, an HST vehicle (HS), and a passenger vehicle (A) is turned on to select a control speed by the deceleration switching means 4 via the external communication means 40 or the deceleration selecting switch 5, it is possible for a vehicle maintenance serviceman (mechanic) to change the deceleration settings.

On the other hand, by adopting a configuration in which deceleration is set by the deceleration selecting switch 5 on the driver's side, it is possible for the operator himself to change the deceleration settings.

Additionally, the setting value of the vehicle speed which is preset is used as a threshold value as a termination condition of the automatic deceleration control, and when the vehicle speed becomes less than the setting value, the automatic deceleration control is released. Therefore, it is possible to bring a state where a braking force is added to an engine brake which is conventionally used, and it is possible to give a braking force without spoiling an operation feeling.

INDUSTRIAL APPLICABILITY

In this embodiment, it is possible to properly set a braking force to bring an operator's feeling into an optimal state. Therefore, it is possible to suitably use the invention for general industrial vehicles represented by material handling machines, such as forklifts and reach stackers, or construction and civil engineering machines, such as motor graders, bulldozers, and wheel loaders where the operator frequently performs acceleration operation depending on work, other than general vehicles including passenger vehicles.

The invention claimed is:

1. A vehicle control device mounted on a vehicle including a vehicle speed sensor which detects a vehicle speed, an accelerator opening detecting sensor which detects an accelerator opening, and braking means that adjusts deceleration of the vehicle, the control device comprising:
    a storage unit which stores a plurality of deceleration tables in which braking parameters required to acquire a predetermined deceleration are set; and
    deceleration selecting means which allows a user to select a deceleration table among the plurality of deceleration tables as a target deceleration,
    wherein when the detected vehicle speed is equal to or lower than a first preset vehicle speed $V_1$ and the detected accelerator opening is equal to or less than a preset accelerator opening after the target deceleration is selected by the deceleration selecting means, the selection of the target deceleration is validated, and
    the selected deceleration table is read from the storage unit, and the braking means is actuated on the basis of the braking parameters specified in the selected deceleration table, thereby executing deceleration control so as to provide the selected target deceleration.

2. The vehicle control device according to claim 1, wherein if the vehicle speed detected by the vehicle speed sensor becomes less than a second preset vehicle speed $V_2$ lower than the first preset vehicle speed ($0<V_2<V_1$) during execution of the deceleration control, the braking of the braking means is weakened or is brought into a non-actuation state, and the execution of the deceleration control is released.

3. The vehicle control device according to claim 1, wherein the deceleration selecting means is arranged within a driver's seat so as to allow the operation by an operator.

4. A vehicle mounted with the control device according to claim 1.

5. The vehicle control device according to claim 1, wherein the preset vehicle speed $V_1$ and the preset accelerator opening are set so as to be variable in correspondence with the selected target deceleration.

6. A vehicle mounted with the control device according to claim 5.

7. The vehicle control device according claim 1, wherein a remote control unit is provided in the deceleration selecting means so that the target deceleration of the deceleration selecting means can be selected from outside the vehicle by a wireless circuit or wire circuit.

8. A vehicle mounted with the control device according to claim 7.

9. A vehicle mounted with the control device according to claim 2.

10. A vehicle mounted with the control device according to claim 3.

11. The vehicle control device according to claim 1, wherein an amount of braking by the braking mean continuously reduces as the detected vehicle speed reduces.

12. The vehicle control device according to claim 1, wherein an amount of braking by the braking mean is constant regardless of the detected vehicle speed.

* * * * *